United States Patent [19]

Iwai et al.

[11] Patent Number: 4,794,998
[45] Date of Patent: Jan. 3, 1989

[54] STRUCTURE FOR SECURELY CONNECTING A DRIVEN SPROCKET TO THE DRIVEN AXLE OF A MOTORCYCLE

[75] Inventors: Toshiyuki Iwai; Yoshimi Ishikawa, both of Saitama, Japan

[73] Assignee: Honda Giken Kogyo Kabushiki Kaisha, Tokyo, Japan

[21] Appl. No.: 98,418

[22] Filed: Sep. 18, 1987

[30] Foreign Application Priority Data

Sep. 25, 1986 [JP] Japan .............................. 61-146763[U]

[51] Int. Cl.⁴ .............................................. B62M 21/00
[52] U.S. Cl. .................................... 180/219; 74/574; 188/130; 267/141.4; 267/281; 280/227; 474/94; 474/902; 474/903
[58] Field of Search .................. 180/219, 227, 226, 72; 74/574; 474/94, 902, 903; 267/141.4, 281, 282; 188/130

[56] References Cited

U.S. PATENT DOCUMENTS

| | | | |
|---|---|---|---|
| 1,892,505 | 12/1932 | Evans | 74/574 X |
| 3,257,860 | 6/1966 | Runde et al. | 474/94 |
| 4,328,879 | 5/1982 | Tone | 474/94 X |
| 4,486,183 | 12/1984 | Posiviata et al. | 474/94 |
| 4,553,622 | 11/1985 | De Cortanze | 180/227 |

FOREIGN PATENT DOCUMENTS 2546804 4/1977 Fed. Rep. of Germany ...... 180/227

61-129386 6/1986 Japan .

Primary Examiner—David M. Mitchell
Assistant Examiner—Mitchell J. Hill
Attorney, Agent, or Firm—Irving M. Weiner; Joseph P. Carrier; Pamela S. Burt

[57] ABSTRACT

A fixing structure is provided for a motorcycle including a swing arm by which an axle having at either end thereof a drive wheel and a torque damping mechanism fixed thereto respectively is rotatably supported substantially at the central part thereof. The fixing structure fixes a driven sprocket to a transversely inner part of an outside constituting member of the torque damping mechanism. The fixing structure includes a plurality of fixing lugs projectingly formed at predetermined intervals on the outer circumference of the outside constituting member, and a plurality of fixing lugs projectingly formed with a predetermined width on the inner circumference of the driven sprocket to be fixedly fastened in a detachable manner with the fixing lugs of the outside constituting member, respectively. The inside diameter of each of the fixing lugs of the driven sprocket is larger than the outside diameter of the outside constituting member itself; the inside diameter of the driven sprocket itself is larger than the outside diameter of each of the fixing lugs of the outside constituting member; and the predetermined width is set smaller than the predetermined intervals.

7 Claims, 2 Drawing Sheets

STRUCTURE FOR SECURELY CONNECTING A DRIVEN SPROCKET TO THE DRIVEN AXLE OF A MOTORCYCLE

BACKGROUND OF THE INVENTION

1. Field of the Invention

The present invention relates to a driven sprocket fixing structure for motorcycles, and particularly, to a driven sprocket fixing structure for a motorcycle having a cantilever type drive wheel. Note, the term "fixing" as used through this application means securely connecting.

2. Description of Relevant Art

The present applicant has disclosed a rear wheel suspension for motorcycles in Japanese Patent Application Lay-Open Print No. 61-129386, laid open June 16, 1986. The suspension includes a rear swing arm of which a forked front part is vertically swingably pivoted to the vehicle body side. The rear swing arm supports a rear wheel at the rear end thereof, in a cantilever manner. Namely, a rear axle rotatably supported at the central part by the rear swing arm has at both end parts thereof the rear wheel and an annular driven sprocket attached thereto, respectively. The driven sprocket itself is rotatable about the rear axle, and a torque damping mechanism including a plurality of rubber blocks is fixed to the axle, outside the sprocket. Drive power from an engine is transmitted to the driven sprocket, and through the torque damping mechanism to the rear wheel in a slightly elastic manner. The suspension, particularly the torque damping mechanism thereof, permits a smooth transmission of engine torque to the rear wheel even in sudden clutching operation, softening the shock of gear shift, thus achieving a favorable gear shift feeling. The driven sprocket is set on the rear axle, possibly close to the rear swing arm in the transverse direction, so that the bending moment of the axle by the sprocket is minimized.

It however is needed, when removing the driven sprocket from the axle for the inspection or maintenance purpose, to remove also the torque damping mechanism which is installed outside the sprocket. The work is thus relatively complicated.

The present invention has been achieved to effectively solve such a problem in a conventional driven sprocket fixing structure for a motorcycle with a cantilever type drive wheel.

SUMMARY OF THE INVENTION

An object of the present invention is to provide a driven sprocket fixing structure for motorcycles, which allows a driven sprocket, set as transversely close to a swing arm as possible, to be solely removed from an axle with ease and without removing a torque damping mechanism from the axle, thus permitting the inspection and maintenance work to be simplified.

To achieve the object the present invention provides, for a motorcycle including a swing arm which is swingably joined at one end thereof to the vehicle body and at a free end of which an axle having at one end thereof a drive wheel fixed thereto is rotatably supported substantially at the central part thereof in a cantilever manner, and a torque damping mechanism fixed to the other end of the axle, a driven sprocket fixing structure for fixing a driven sprocket to a transversely inner part of an outside constituting member of the torque damping mechanism. The fixing structure comprises a plurality of fixing lugs projectingly formed at predetermined intervals on the outer circumference of the outside constituting member, a plurality of fixing lugs projectingly formed with a predetermined width on the inner circumference of the driven sprocket to be fixedly fastened in a detachable manner with the fixing lugs of the outside constituting member respectively, the inside diameter of each of the fixing lugs of the driven sprocket being larger than the outside diameter of the outside constituting member itself, the inside diameter of the driven sprocket itself being larger than the outside diameter of each of the fixing lugs of the outside constituting member, and the predetermined width being set smaller than the predetermined intervals.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
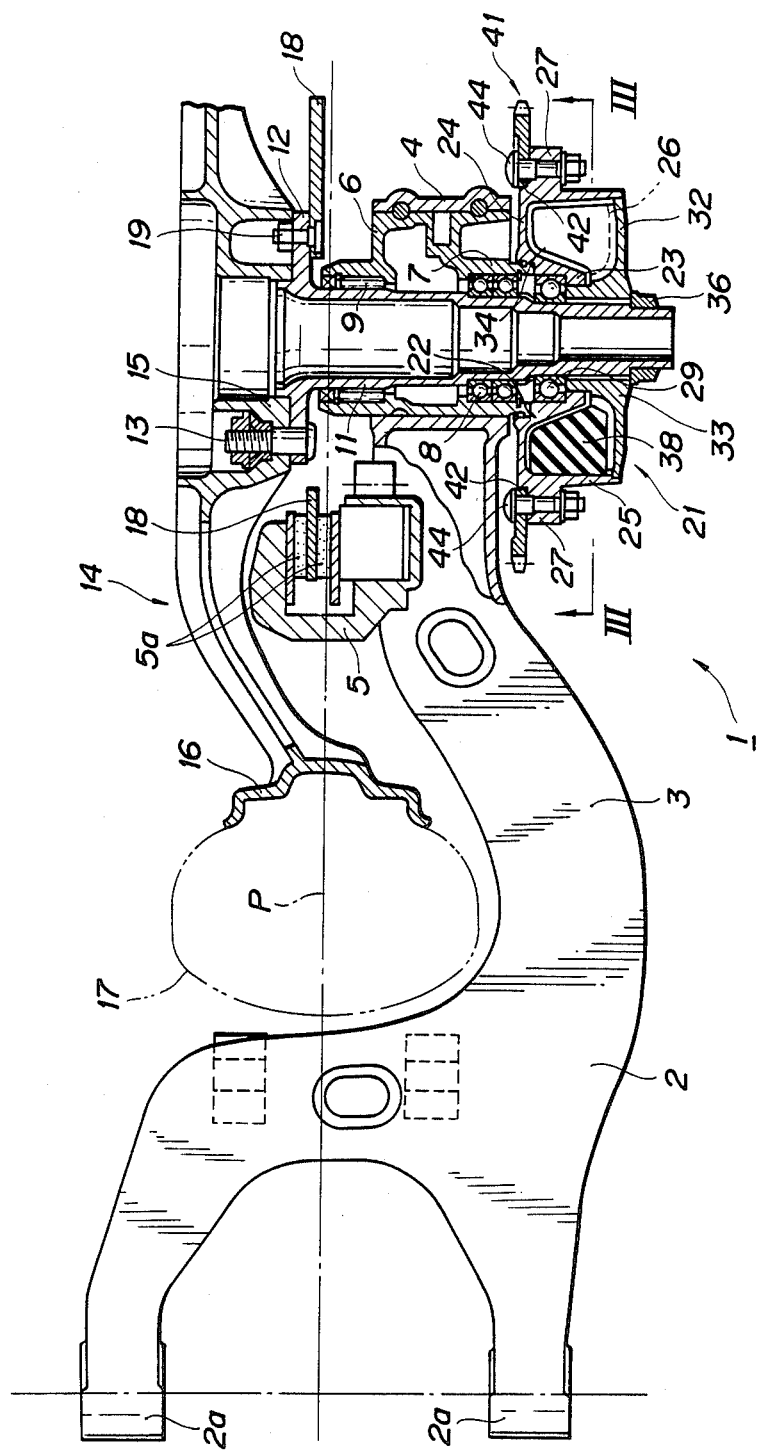
FIG. 1 is a sectional plan view of a driven sprocket fixing structure of a motorcycle according to a preferred embodiment of the present invention.
Figures 2, 3:
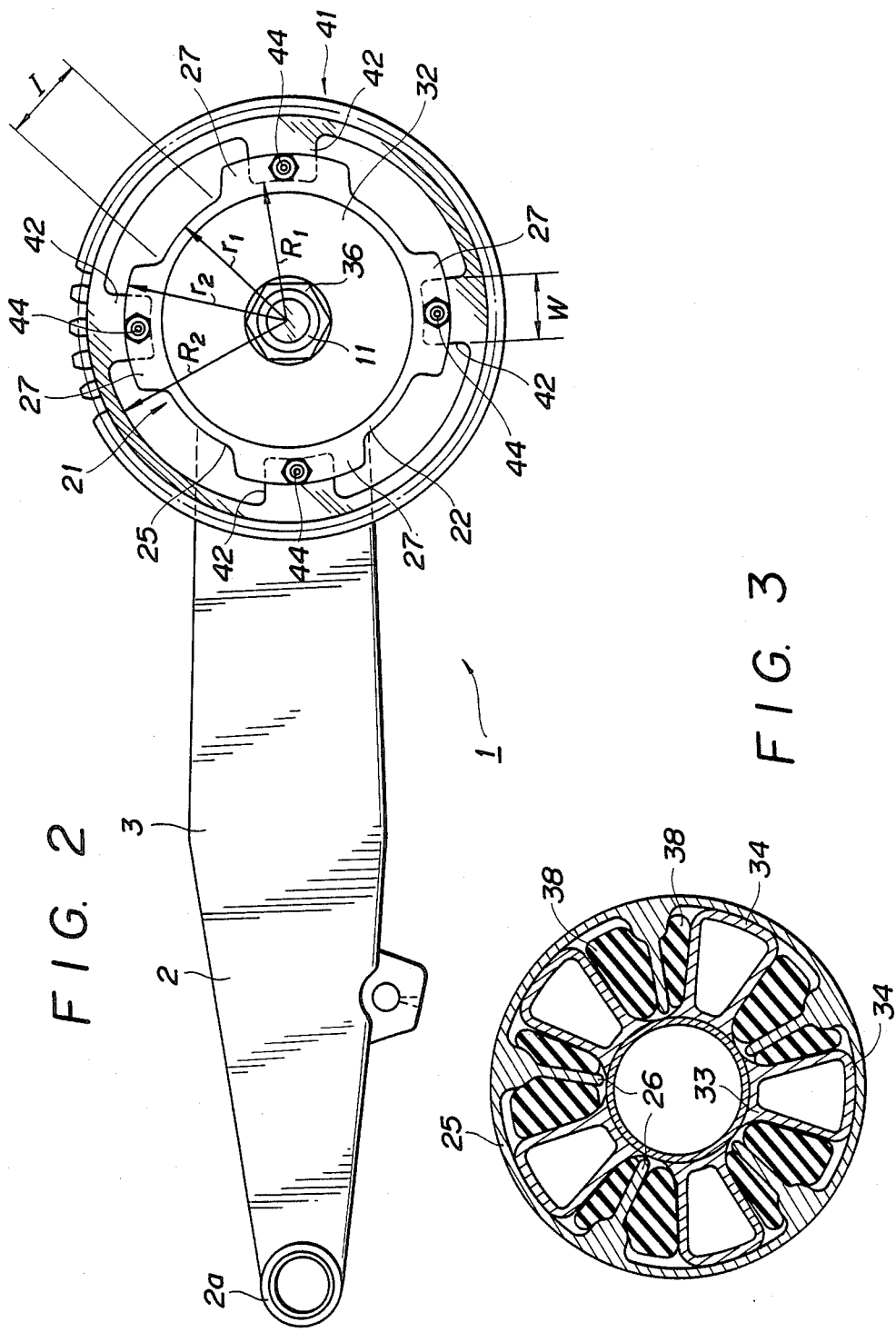
FIG. 2 is a side view of the fixing structure.
FIG. 3 is a sectional view taken along line III—III of 1.

Referring to FIGS. 1 and 2, designated at reference number 1 is a driven sprocket fixing structure of a motorcycle according to a preferred embodiment of the present invention. The fixing structure 1 is for fixing a driven sprocket 41 at one side of a rear axle 11 which is rotatably attached to the rear end of a rear swing arm 2.

The rear swing arm 2 has a bifurcate front part of which left and right branches are verticaly swingably joined at the front ends 2a, 2a thereof to an unshown vehicle body of the motorcycle. A longitudinally intermediate part 3 of swing arm 2 is curved in either sense of the transverse direction, to the left in the embodiment, while a rear end part 4 is located close to an imaginary vertical plane P including the longitudinal centerline of the motorcycle. The rear end part 4 has an axle holder 6 fitted thereon, which is substantially cylindrical as a whole and restricted in rotation to the end part 4 by means of an unshown fixing member. The holder 6 includes an inner cylindrical portion 7 of which the longitudinal axis is offset from that of holder 6 itself. In the offset inner cylindrical portion 7 there is inserted the rear axle 11, which is rotatably supported by bearings 8, 9. The inner cylindrical portion 7, and hence the axle 11, is adjustable in longitudinal position by rotating holder 6 in rear end part 4 after solving the restriction by the fixing member. The rear axle 11 is formed with a hub disc 12 at the right end. A rear wheel 14 is fixed to the hub disc 12 in a cantilever manner. More particularly, a wheel hub 15 of the rear wheel 14 is fastened by means 13 of bolts and nuts to the outside of hub disc 12. A wheel rim 16 of rear wheel 14 faces the curved swing arm part 3, from inside, and is fitted with a tire 17 centered to the vertical plane P. An annular brake disc 18 is fastened by means 19 of bolts and nuts to the inside of hub disc 12 so as to be integrally rotatable with rear wheel 14. The outer circumferential part of brake disc 18 is located between a pair of pads 5a, 5a of a brake caliper 5 which is fixed to the swing arm 2. As will be understood from the above discussion, the drum-like housing 22 (or the cyclindrical portion 25 thereof) is an outside constituting member of torque dampening mechanism 21, while the disk-like cover 32 is an inside constituting member of the torque dampening mechanism.

At the left end of rear axle 11 there is arranged a torque damping mechanism 21 for transmitting drive power from driven sprocket 41 to axle 11 in an elastic manner. The torque damping mechanism 21 includes a drum-like damper housing 22 of which an inner cylindrical portion 23 is rotatably fitted on axle 11 by a bearing 29, in a close position to the end face of inner cylindrical portion 7 of axle holder 6. On the outer circumferential part of inner cylindrical portion 23, at the transversely inner side, there is formed a radially outwardly extending annular flange part 24 which is rotatably fitted at the inner circumference thereof on the inner cylindrical portion 7 of holder 7. The flange part 24 is formed with a leftwardly extending outer cylindrical part 25 at the outer circumference thereof. The outer cylindrical part 25 has a plurality of radially outward projecting fixing lugs 27 formed thereon, which are fixedly fastened at the transversely inner side thereof with a plurality of fixing lugs 42 on the inner circumference of driven sprocket 41 by means 44 of bolts and nuts, respectively. An inner cylindrical part 33 of a disc-like cover 32 is spline fitted on the left end part of axle 11 and secured thereto by a nut 36. The inner cylindrical portion 23 of damper housing 22 is rotatably fitted at its inner circumference on a transversely inner portion of the outer circumference of the inner cylindrical part 33 The cover 32 closes a space defined between inner cylindrical portion 23 and outer cylindrical part 25 of housing 22, at the left.

As shown in FIG. 3 also, the outer cylindrical part 25 of housing 22 has a plurality of separation flanges 26 projectingly formed on the inner circumferential surface thereof, toward the inner cylindrical portion 23, and circumferentially spaced at equal intervals. Incidentally, in FIG. 3, rear axle 11, fixing lugs 27 and the like are omitted. On the other hand, the inner cylindrical part 33 of cover 32 has a plurality of separation arms 34 projectingly formed on the outer circumferential surface thereof, toward the outer cylindrical part 25, and circumferentially spaced at equal intervals. Between flanges 26 and arms 34 there are interposed block-like rubber members 38 for damping purpose, without leaving circumferential gaps. Drive power is transmitted through an unshown chain and transmission to the driven sprocket 41, the rotation of which is transmitted in a slightly elastic manner through damper housing 22, separation flanges 26, rubber members 38, separation arms 34 and disc-like cover 32 to the rear axle 11, which rotates to drive the rear wheel 14. The torque damping mechanism 21 permits a smooth transmission of engine torque to rear wheel 14 even in sudden clutching operation, softening the shock of gear shift, thus achieving a favorable gear shift feeling. The driven sprocket 41 is installed on the rear axle 11, transversely possibly close to the rear swing arm 2, so that the bending moment of axle 11 by sprocket 41 is minimized.

Referring now to FIG. 2, the fixing lugs 27 are projectingly formed, four in total, on the outer circumference of outer cylindrical part 25 of housing 22, on the transversely inner side thereof, and circumferentially spaced at equal intervals. The driven sprocket 41 is fixed to those lugs 27, at the transversely outer side of the sprocket. To effect such connection, the sprocket 41 also has four lugs 42 projectingly formed on the inner circumference thereof and circumferentially spaced at equal intervals. As depicted, the fixing lugs 42 of the driven sprocket 41 are securely connected or fixed to the fixing lugs 27 such that they overlap with each other, respectively, when viewed from a lateral side of the motorcycle. The numbers of lugs 27 and 42 may however be arbitrarily determined if they are equal to each other. The inside diameter $2R_1$ of the fixing lugs 42 of sprocket 41 is set larger than the outside diameter $2r_1$ of outer cylindrical part 25 of housing 22. The inside diameter $2R_2$ of sprocket 41 itself is larger than the outside diameter $2r_2$ of the housing 22 side fixing lugs 27. The lugs 42 of sprocket 41 have a circumferential width W set smaller than the circumferential intervals I of the lugs 27 of housing 22.

The driven sprocket 41 is assembled to housing 22 in the following manner. First, each lug 42 of sprocket 41 is set in a position between neighboring two lugs 27 of housing 22, in side view, as shown by imaginary lines of FIG. 2. Sprocket 41 is then slid toward the rear wheel 14 till the transversely outside surface of the lug 42 goes over the transversely inside surfaces of the lugs 27, and circumferentially rotated at a predetermined angle, at 45° in the embodiment, so that the fixing bolt holes of lugs 27, 42 match with each other. Thereafter, the lugs 27, 42 are fastened to be fixedly joined to each other by tightening inserted bolts and nuts 44. Such tightening work may be performed from behind the rear end part 4 of rear swing arm 2.

In the removal of driven sprocket 41 from damper housing 22, the foregoing steps are reversed. Thus, the sprocket 41 is removable from the housing 22 without the need of removing the housing 22 from axle 11.

According to the embodiment, the driven sprocket 41 is transversly movable with no binding between lugs 27, 42 of housing 22 and sprocket 41. The sprocket 41, which is transversely possibly close in position to rear swing arm 2, can be solely detached from rear axle 11. Inspection and maintenance services of sprocket 41, as well as replacement work thereof, are thus facilitated and simplified.

In the above embodiment, a driven sprocket fixing structure according to the invention is embodied as one for a rear swing arm. The present inventon may however be otherwise applied, exemparily to a driven sprocket for a front swing arm and the like.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

We claim:

1. A driven sprocket fixing structure for a motorcycle including a swing arm which is swingably joined at one end thereof to a vehicle body and at a free end of which an axle having at one end thereof a drive wheel fixed thereto is rotatably supported substantially at the central part thereof in a cantilever manner, and a torque damping mechanism fixed to the other end of said axle, said fixing structure fixing a driven sprocket to a transversely inner part of an outside constituting member of said torque damping mechanism, wherein:

said fixing structure comprises:
- a plurality of fixing lugs projectingly formed at predetermined intervals on an outer circumference of said outside constituting member; and
- a plurality of fixing lugs projectingly formed with a predetermined width on an inner circumference of said sprocket to be fixedly fastened in a detachable manner with said fixing lugs of said outside constituting member, respectively; and
- an inside diameter of each of said fixing lugs of said driven sprocket is larger than an outside diameter of said outside constituting member itself, an inside diameter of said driven sprocket itself is larger than an outside diameter of each of said fixing lugs of said outside constituting member, and said predetermined width being smaller than said predetermined intervals.

2. A driven sprocket fixing structure according to claim 1, wherein:
said outside constituting member of said torque damping mechanism is annular, and said driven sprocket is annular.

3. A driven sprocket fixing structure according to claim 2, wherein:
said fixing lugs of said outside constituting member of said torque damping mechanism are spaced at equal intervals in a circumferential direction of the outer circumference of said outside constituting member, and said fixing lugs of said driven sprocket are spaced at equal intervals in a circumferential direction of the inner circumference of said driven sprocket.

4. A driven sprocket fixing structure according to claim 1, wherein:
said outside constituting member of said torque damping mechanism is rotatably fitted on said axle; and
said torque damping mechanism further includes an inside constituting member fixedly attached to said axle, and a rubber member interposed between said outside constituting member and said inside constituting member to transmit drive power, as transmitted to said driven sprocket, from said outside constituting member to said inside constituting member in a slightly elastic manner.

5. A driven sprocket fixing structure according to claim 1, wherein:
said swing arm is a rear swing arm.

6. A driven sprocket fixing structure for a motorcycle including a swing arm which is swingably joined at one end thereof to a vehicle body and a free end of which an axle having at one end thereof a drive wheel fixed thereto is rotatably supported substantially at a central part thereof in a cantilever manner, and a torque damping mechanism fixed to the other end of said axle, said fixing structure fixing a driven sprocket to a transversely inner part of an outside constituting member of said torque damping mechanism, said fixing structure comprising:
- a plurality of fixing lugs projectingly formed at predetermined intervals on an outer circumference of an outside constituting member of a torque damping mechanism; and
- a plurality of fixing lugs projectingly formed with a predetermined width on an inner circumference of a driven sprocket and securely connected in a detachable manner to transversely inner sides of the fixing lugs of the outside constituting member, respectively;
- an inside diameter of each of said fixing lugs of said driven sprocket being larger than an outside diameter of said outside constituting member itself, an inside diameter of said driven sprocket itself being larger than an outside diameter of each of said fixing lugs of said outside constituting member, and said predetermined width being smaller than said predetermined intervals;
- said outside constituting member of said torque damping mechanism being rotatably fitted on said axle; and
- said torque damping mechanism further including an inside constituting member fixed to said axle, and a rubber member interposed between said outside constituting member and said inside constituting member to transmit drive power, as transmitted to said driven sprocket, from said outside constituting member to said inside constituting member in a slightly elastic manner.

7. A driven sprocket fixing structure according to claim 1, wherein:
the fixing lugs of said driven sprocket are securely connected to the fixing lugs of said outside constituting member such that they overlap with each other, respectively, when viewed from a lateral side of the motorcycle.

* * * * *

UNITED STATES PATENT AND TRADEMARK OFFICE
CERTIFICATE OF CORRECTION

PATENT NO. : 4,794,998

DATED : January 3, 1989

INVENTOR(S) : Iwai et al.

It is certified that error appears in the above-identified patent and that said Letters Patent is hereby corrected as shown below:

```
Column 1, line 12, change "through" to --throughout--.
Column 2, line 27, change "1" to --Fig. 1--;
          line 39, correct the spelling of --vertically--.
Column 3, line 20, change "holder 7" to --holder 6--;
          line 34, after "33" insert a period.
          line 49, change "purpose" to --purposes--.
Column 4, line 49, correct the spelling of --exemplarily--.
Column 5, line 9 (claim 1, line 17), after "said" insert --driven--.
```

Signed and Sealed this

Nineteenth Day of September, 1989

Attest:

DONALD J. QUIGG

*Attesting Officer*   Commissioner of Patents and Trademarks